(12) United States Patent
Hedau et al.

(10) Patent No.: US 9,152,882 B2
(45) Date of Patent: Oct. 6, 2015

(54) LOCATION-AIDED RECOGNITION

(75) Inventors: Varsha Hedau, Schaumburg, IL (US); Sudipta Sinha, Redmond, WA (US); Charles Lawrence Zitnick, Seattle, WA (US); Richard Szeliski, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 804 days.

(21) Appl. No.: 13/162,591

(22) Filed: Jun. 17, 2011

(65) Prior Publication Data

US 2012/0321175 A1 Dec. 20, 2012

(51) Int. Cl.
*G06K 9/62* (2006.01)

(52) U.S. Cl.
CPC ............ *G06K 9/6227* (2013.01); *G06K 9/6231* (2013.01)

(58) Field of Classification Search
CPC .......................... G06K 9/6227; G06K 9/6231
USPC .......................... 382/170, 181, 195, 217, 224
See application file for complete search history.

(56) References Cited

U.S. PATENT DOCUMENTS

| | | | |
|---|---|---|---|
| 7,015,831 B2 | 3/2006 | Karlsson et al. | |
| 2005/0063563 A1 | 3/2005 | Soliman | |
| 2005/0271352 A1 | 12/2005 | Yokouchi | |
| 2007/0115373 A1 | 5/2007 | Gallagher et al. | |
| 2009/0076996 A1 | 3/2009 | Hull et al. | |
| 2010/0009713 A1* | 1/2010 | Freer | 455/556.1 |
| 2010/0146604 A1* | 6/2010 | Piccionelli | 726/6 |
| 2010/0329574 A1* | 12/2010 | Moraleda et al. | 382/217 |
| 2011/0091112 A1 | 4/2011 | Engstrom et al. | |
| 2011/0150324 A1 | 6/2011 | Ngan et al. | |
| 2012/0106847 A1* | 5/2012 | Qi | 382/195 |
| 2012/0321175 A1* | 12/2012 | Hedau et al. | 382/159 |
| 2014/0226906 A1* | 8/2014 | Kang | 382/197 |
| 2014/0337375 A1* | 11/2014 | Yue | 707/769 |
| 2015/0007258 A1* | 1/2015 | Patey et al. | 726/1 |

OTHER PUBLICATIONS

"International Search Report", Mailed Date: Nov. 28, 2012, Application No. PCT/US2012/042106, Filed Date: Jun. 13, 2012, pp. 09.
Ni, et al., "Epitomic Location Recognition", Retrieved at <<http://research.microsoft.com/en-us/um/people/ankannan/Papers/CVPR2008.pdf>>, IEEE Conference on Computer Vision and Pattern Recognition, Jun. 23-28, 2008, pp. 8.

(Continued)

*Primary Examiner* — Gregory M Desire
(74) *Attorney, Agent, or Firm* — Miia Sula; Judy Yee; Micky Minhas

(57) ABSTRACT

A mobile device having the capability of performing real-time location recognition with assistance from a server is provided. The approximate geophysical location of the mobile device is uploaded to the server. Based on the mobile device's approximate geophysical location, the server responds by sending the mobile device a message comprising a classifier and a set of feature descriptors. This can occur before an image is captured for visual querying. The classifier and feature descriptors are computed during an offline training stage using techniques to minimize computation at query time. The classifier and feature descriptors are used to perform visual recognition in real-time by performing the classification on the mobile device itself.

20 Claims, 9 Drawing Sheets

(56) References Cited

OTHER PUBLICATIONS

Cristani, et al., "Geo-Located Image Categorization and Location Recognition", Retrieved at <<http://profs.sci.univr.it/~castella/papers/pdf/PRIA.pdf>>, Pattern Recognition and Image Analysis, vol. 102, No. 1, Jun. 2009, pp. 1-18.
Yeh, et al., "Searching the Web with Mobile Images for Location Recognition", Retrieved at <<http://groups.csail.mit.edu/vision/vip/papers/yeh_cvpr04.pdf>>, Proceedings of the 2004 IEEE Computer Society Conference on Computer Vision and Pattern Recognition, Jun. 27-Jul. 2, 2004, pp. 1-6.
Bruns, et al., "Phone-to-Phone Communication for Adaptive Image Classification", Retrieved at <<http://140.78.90.140/medien/ar/Pub/PhoneGuide_MoMM.pdf>>, 6th International Conference on Mobile Computing and Multimedia, Nov. 24-26, 2008, pp. 6.
Amit, et al., "Shape Quantization and Recognition with Randomized Trees", Retrieved at <<http://citeseer.ist.psu.edu/viewdoc/download;jsessionid=548D6551676F0AB18310C798DBD55A53?doi=10.1.1.102.5478&rep=rep1&type=pdf>>, Aug. 1996, pp. 1-56.
Arth, et al., "Wide Area Localization on Mobile Phones", Retrieved at <<http://ieeexplore.ieee.org/stamp/stamp.jsp?tp=&arnumber=5336494>>, Proceedings, 8th IEEE International Symposium on Mixed and Augmented Reality, ISMAR, Oct. 19-22, 2009, pp. 73-82.
Baatz, et al., "Handling Urban Location Recognition as a 2D Homothetic Problem", Retrieved at <<http://www.stanford.edu/~dmchen/documents/ECCV2010_LocationRecognition.pdf>>, European Conference on Computer Vision (ECCV), Sep. 2010, pp. 1-14.
Breiman, Leo., "Random Forests", Retrieved at <<http://citeseerx.ist.psu.edu/viewdoc/download?doi=10.1.1.23.3999&rep=rep1&type=pdf>>, Jan. 2001, pp. 1-33.
Calonder, et al., "Brief: Binary Robust Independent Elementary Features", Retrieved at <<http://cvlab.epfl.ch/~calonder/CalonderLSF10.pdf>>, 11th European Conference on Computer Vision, Sep. 5-11, 2010, pp. 1-14.
Chum, et al., "Total Recall: Automatic Query Expansion with a Generative Feature Model for Object Retrieval", Retrieved at <<http://www.robots.ox.ac.uk/~vgg/publications/papers/chum07b.pdf>>, IEEE 11th International Conference on Computer Vision, Oct. 14-21, 2007, pp. 8.
Fischler, et al., "Random Sample Consensus: A Paradigm for Model Fitting with Applications to Image Analysis and Automated Cartography", Retrieved at <<http://www.ai.sri.com/pubs/files/836.pdf>>, Jun. 1981pp. 381-395.
Hays, et al., "IM2GPS: Estimating Geographic Information from a Single Image", Retrieved at <<http://ieeexplore.ieee.org/stamp/stamp.jsp?tp=&arnumber=4587784>>, IEEE Conference on Computer Vision and Pattern Recognition, Jun. 23-28, 2008, pp. 8.
"Street View—Explore the World at Street Level", Retrieved at http://maps.google.com/help/maps/streetview>> Retrieved Date: Jun. 13, 2011, p. 1.
"Maps for India", Retrieved at <<http://www.bing.com/maps/>>, Retrieved Date: Jun. 13, 2011, pp. 1.
Hua, et al., "Discriminant Embedding for Local Image Descriptors", Retrieved at <<http://users.eecs.northwestern.edu/~ganghua/publication/ICCV07.pdf>>, IEEE 11th International Conference on Computer Vision, Oct. 14-21, 2007, pp. 8.
Irschara, et al., "From Structure-from-motion Point Clouds to Fast Location Recognition", Retrieved at <<http://www.icg.tu-graz.ac.at/publications/pdf/cvpr2009localization.pdf>>, CVPR, 2009, pp. 8.
Shotton, et al., "Semantic Texton Forests for Image Categorization and Segmentation", Retrieved at <<http://citeseerx.ist.psu.edu/viewdoc/download?doi=10.1.1.145.3036&rep=rep1&type=pdf>>, IEEE Conference on Computer Vision and Pattern Recognition, Jun. 23-28, 2008, pp. 8.
Knopp, et al., "Avoiding Confusing Features in Place Recognition", Retrieved at <<http://www.di.ens.fr/~josef/publications/knopp10.pdf>>, 11th European Conference on Computer Vision, Sep. 5-11, 2010, pp. 1-14.

Lepetit, et al., "Keypoint Recognition using Randomized Trees", Retrieved at <<http://cvlab.epfl.ch/~lepetit/papers/lepetit_pami06.pdf>>, IEEE Transactions on Pattern Analysis and Machine Intelligence, Sep. 2006, pp. 19.
Li, et al., "Modeling and Recognition of Landmark Image Collections using Iconic Scene Graphs", Retrieved at <<http://www.cs.unc.edu/~xwli/publication/eccv08.pdf>>, Proceedings of the 10th European Conference on Computer Vision, 2008, pp. 1-14.
Li, et al., "Landmark Classification in Large-scale Image Collections", Retrieved at <<http://ieeexplore.ieee.org/stamp/stamp.jsp?tp=&arnumber=5459432>>, IEEE 12th International Conference on Computer Vision, Sep. 29-Oct. 2, 2009, pp. 1957-1964.
Li, et al., "Location Recognition using Prioritized Feature Matching", Retrieved at <<http://www.cs.cornell.edu/~snavely/publications/papers/localization_eccv_2010.pdf>>, 11th European Conference on Computer Vision, Sep. 5-11, 2010, pp. 1-14.
Lowe, David G., "Distinctive Image Features from Scale-invariant Keypoints", Retrieved at <<http://people.cs.ubc.ca/~lowe/papers/ijcv04.pdf>>, Jan. 5, 2004, pp. 1-28.
Micušik, et al., "Detection and Matching of Rectilinear Structures", Retrieved at <<http://ieeexplore.ieee.org/stamp/stamp.jsp?tp=&arnumber=4587488>>, IEEE Conference on Computer Vision and Pattern Recognition, Jun. 23-28, 2008, pp. 7.
Nister, et al., "Scalable Recognition with a Vocabulary Tree", Retrieved at <<http://www.vis.uky.edu/~stewe/publications/nister_stewenius_cvpr2006.pdf>>, IEEE Computer Society Conference on Computer Vision and Pattern Recognition, 2006, pp. 8.
Chum, et al., "Near Duplicate Image Detection: Min-hash and tf-idf Weighting", Retrieved at <<http://www.robots.ox.ac.uk/~vgg/publications/papers/chum08a.pdf>>, Proceedings of the British Machine Vision Conference, Sep. 2008, pp. 10.
Chum, et al., "Geometric Min-hashing: Finding a (Thick) Needle in a Haystack", Retrieved at <<http://cmp.felk.cvut.cz/~chum/papers/chum09cvpr.pdf>>, IEEE Computer Society Conference on Computer Vision and Pattern Recognition CVPR, Jun. 20-25, 2009, pp. 8.
Philbin, et al., "Object Retrieval with Large Vocabularies and Fast Spatial Matching", Retrieved at <<http://ieeexplore.ieee.org/stamp/stamp.jsp?tp=&arnumber=4270197>>, IEEE Conference on Computer Vision and Pattern Recognition, Jun. 17-22, 2007, pp. 8.
Robertson, et al., "An Image based System for Urban Navigation", Retrieved at <<http://www.comp.leeds.ac.uk/bmvc2008/proceedings/2004/papers/paper_260.pdf>>, In British Machine Vision Conference, 2004, pp. 10.
Schindler, et al., "City-scale Location Recognition", Retrieved at <<http://ieeexplore.ieee.org/stamp/stamp.jsp?tp=&arnumber=4270175>>, IEEE Conference on Computer Vision and Pattern Recognition, Jun. 17-22, 2007, pp. 7.
Shao, et al., "Zubud-zurich Buildings Database for Image based Recognition", Retrieved at <<http://www.vision.ee.ethz.ch/showroom/zubud/report-db.ps>>, Technical Report No. 260, Apr. 25, 2003, pp. 1-3.
Snavely, et al., "Photo Tourism: Exploring Photo Collections in 3D", Retrieved at <<http://citeseer.ist.psu.edu/viewdoc/download;jsessionid=411B547518AFE650803E37750445D47F?doi=10.1.1.62.910&rep=rep1&type=pdf>>, ACM Transactions on Graphics, 2006, pp. 12.
Turcot, et al., "Better Matching with Fewer Features: The Selection of Useful Features in Large Database Recognition Problems", Retrieved at <<http://www.cs.ubc.ca/~lowe/papers/09turcot.pdf>>, IEEE 12th International Conference on Computer Vision Workshops (ICCV Workshops), Sep. 27-Oct. 4, 2009, pp. 8.
Zamir, et al., "Accurate Image Localization based on Google Maps Street View", Retrieved at <<http://server.cs.ucf.edu/~vision/news/Zamir_ECCV_2010.pdf>>, 11th European Conference on Computer Vision, Sep. 5-11, 2010, pp. 1-14.
Zhang, et al., "Hierarchical Building Recognition", Retrieved at <<http://citeseerx.ist.psu.edu/viewdoc/download?doi=10.1.1.85.4554&rep=rep1&type=pdf>>, Feb. 8, 2006, pp. 22.
"International Preliminary Report on Patentability", Mailed Date: Dec. 17, 2013, Application No. PCT/US2012/042106, Filed Date: Jun. 13, 2012, pp. 6.
"Communication pursuant to Article 94(3) EPC", Mailed Date: Apr. 1, 2015, Application No. 12801011.3—1901, Filed Date: Jun. 13, 2012, pp. 6.

(56) References Cited

OTHER PUBLICATIONS

Hoashi, K. et al., "Constructing A Landmark Identification System for Geo-tagged Photographs Based on Web Data Analysis", Multimedia and Expo, 2009, ICME 2009, IEEE International Conference on Multimedia and Expo, Available at: http://ieeexplore.ieee.org/xpl/articleDetails.jsp?arnumber=5202569, Jun. 2009, pp. 4.

Guan, et al., "GPS-Aided Recognition-Based User Tracking System With Augmented Reality in Extreme Large-Scale Areas", MMSYS11 Proceedings of the Second Annual ACM Conference on Multimedia Systems, Available at: http://www.researchgate.net/profile/Wei_Guan3/publication/221636651_GPS-aided_recognition-based_user_tracking_system_with_augmented_reality_in_extreme_large-scale_areas/links/02e7e517ed85f8333d000000.pdf, Feb. 2011, pp. 10.

Yaegashi, et al, "Can Geotags Help Image Recognition?", Proceedings of the 3rd Pacific Rim Symposium on Advances in Image and Video Technology, Available at: http://dl.acm.org/citation.cfm?id=1505983, Jan. 2009, pp. 14.

* cited by examiner

300

LOCATION-AIDED RECOGNITION

BACKGROUND

The proliferation of mobile devices having cameras has increased the need for location recognition applications that can recognize an image taken from the mobile device's camera. Since a mobile device has limited storage capacity and computational resources, the task of visual location recognition is often performed remotely. The mobile device may upload an image taken from the mobile device to a server. The server matches the image with similar images stored on the server. The stored images are annotated with geographic data pertaining to the location of the image. The server downloads the location of the image to the mobile device. However, the mobile device may have limited bandwidth to communicate with the server. The latency involved in transmitting images and data between the mobile device and the server may be a bottleneck for the mobile device to perform the location recognition in real time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A mobile device performs real-time location recognition with minimal assistance from a server. The geophysical location of the mobile device is uploaded from the mobile device to the server. The server provides the mobile device with a compact classifier and feature descriptors based on the mobile device's geophysical location. The mobile device may then capture an image which is then classified using the compact classifier and feature descriptors. The outcome of the classification is an estimation of the probability that the image is a particular class or landmark.

The classifier and feature descriptors are generated through an offline training stage and are configured to minimize computational processing. In an embodiment, the classifier is a random decision forest trained using stored images from the same geophysical location and class. The method for training the random decision forest automatically selects the most discriminative features present in the images. This results in a classifier that is compact and therefore can be quickly downloaded to the mobile device but also allows the computation for the classification step to be performed in real time on the mobile device.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
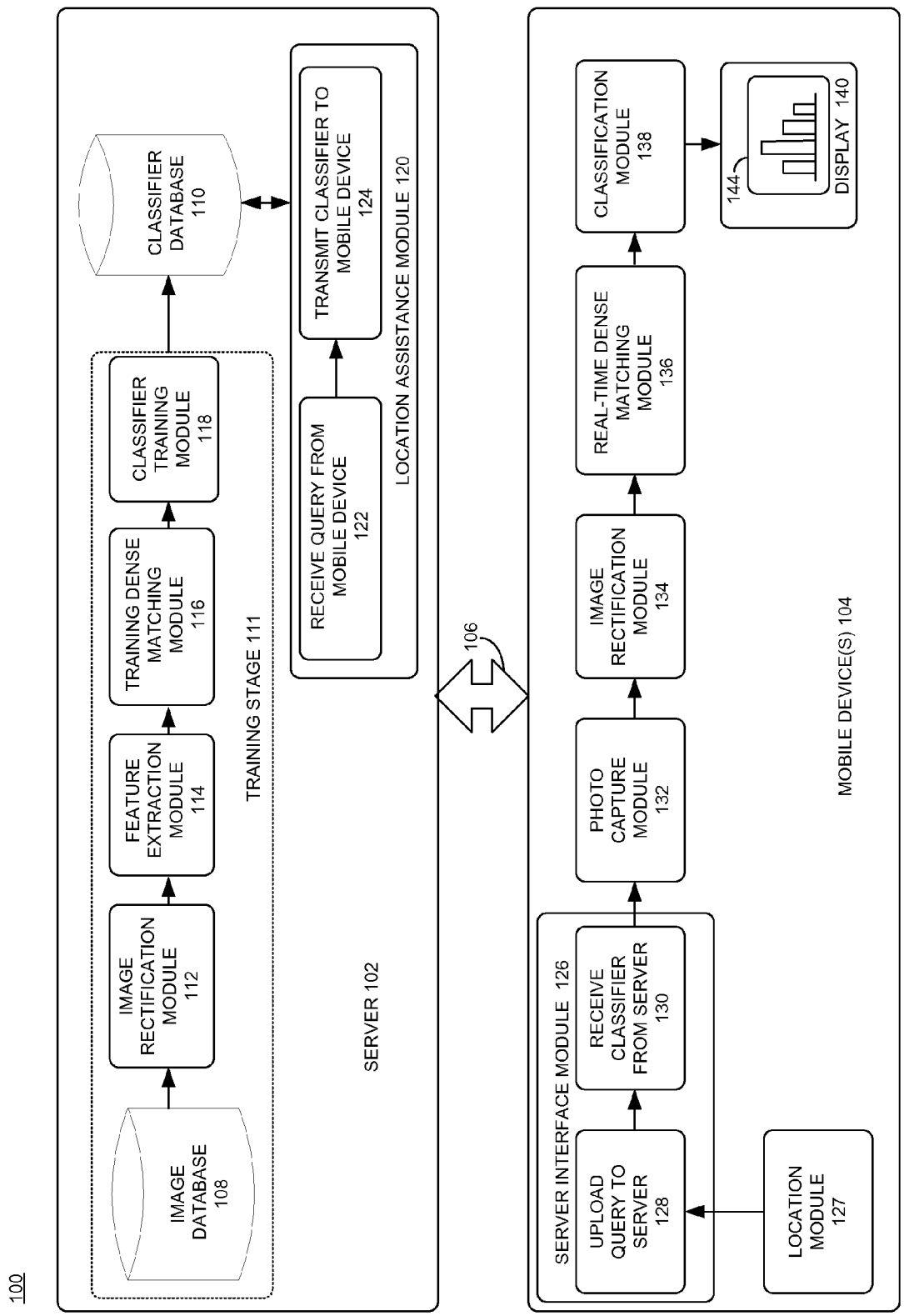
FIG. 1 illustrates a block diagram of an exemplary system for location-aided recognition.

Various embodiments are directed to a technology that performs real-time location-aided recognition. Location recognition is a computationally burdensome process requiring large amounts of storage and computational time. Real-time location recognition is practical for mobile devices when computationally efficient techniques are used. The technology described herein relies on the use of compressed data structures and techniques for reducing this computational burden without degrading the accuracy of the recognition.

A classifier may be used to recognize an image captured by a camera in a mobile device by classifying it as one of a set of pre-determined classes or landmarks within a specific geophysical location. In an embodiment, the classifier may be a random decision forest having several random decision trees. A random decision tree may be used to compare a feature of the captured image with training images having the same geophysical location and class. A class is an identifier that describes an image, such as a landmark, a specific building or a structure. The classification involves traversing a random decision tree from a root node to a leaf node through a series of comparisons. Each comparison represents a binary test which evaluates whether a particular feature is present in the captured image. This is done by first searching for the most similar feature in the captured image using a metric such as Hamming distance and comparing it to a threshold. The threshold quantifies the likelihood of a match which is learned from the training images. The tree traversal ends at a leaf node that indicates the likelihood that the captured image is a particular class or landmark. The classification is performed independently by each random decision tree in the random decision forest. The average of all the probabilities produced from traversing each random decision tree may be used to estimate the most likely class of the image.

In an embodiment, a server may be used to assist the mobile device in its real-time location recognition. The server generates a random decision forest for each geophysical location and class during an offline training stage. The random decision trees in a random decision forest are trained using stored images from the same geophysical location and class. The random decision trees are generated using a set of feature descriptors having been analyzed to contain the most salient features of an image.

In an offline training stage, training images associated with the same geophysical location are analyzed to determine the most salient features of the image. A feature extraction process is performed that extracts features from the training images and analyzes them to select a subset having discriminative characteristics. Each feature in the subset is then transformed into a more compact representation known as a feature descriptor. A dense matching process is performed to determine which feature descriptors represent the more salient features in an image.

The search for the salient features is performed by computing a similarity score, such as a Hamming distance, for each feature descriptor in each image. In order to minimize the number of Hamming distance computations involved in this search, a min hashing process is used to determine which feature descriptors are similar thereby necessitating the computation of the Hamming distance. The Hamming distance computation is avoided for dissimilar feature descriptors as their similarity scores are likely to be lower. A table containing the feature descriptors corresponding to each training image is used to train the random decision forest. Each element of that feature descriptor is obtained by computing the similarity score between each feature descriptor and the most similar descriptor found in the whole image. The method for training the random decision forest automatically selects the most discriminative features present in the images of the various classes. This results in a classifier that is compact and therefore can be quickly downloaded to the mobile device and also allows the computation for the classification step to be performed in real time on the device.

In an embodiment, the mobile device obtains the random decision forest and the feature descriptors from the server from a query using just the geophysical location of the mobile device. In an embodiment, the geophysical location may be the mobile device's GPS coordinates. In this manner, the latency in transmitting and receiving data between the server and the mobile device is minimized. The mobile device then captures an image which is then classified using the random decision forest. The outcome results in an estimation of the probability that the image is a particular class. Attention now turns to a more detailed description of the embodiments for location-aided recognition.

Referring to FIG. 1, there is shown a system 100 for location-aided recognition. The system 100 may contain a server 102 in communication with one or more mobile devices 104. In an embodiment, the server 102 and the mobile devices 104 may be communicatively coupled via a communications network 106. The communications network 106 may be composed of various types of communication media which may include wired or wireless communication media, and any combination thereof. For instance, the mobile device 104 may communicate through a wireless communication medium to a wireless access point that is coupled to the server 102 through a wired communication medium. Alternatively, the mobile device 104 may communicate through a wireless communication medium directly to the server 102. The wireless communication medium may operate using any wireless technology, such as without limitation, the IEEE 802 family of wireless standards, Wi-Fi, WiMax, Bluetooth™, or any combination thereof.

The server 102 may include without limitation a computer, a personal computer, a desktop computer, a laptop computer, a notebook computer, a handheld computer, a server array or server farm, a mini-computer, a mainframe computer, a supercomputer, a distributed computing system, a multiprocessor system, or combination thereof. A mobile device 104 may be any portable electronic device having the capability to communicate via a wireless communications medium, such as without limitation, a personal digital assistant, a mobile computing device, a smart phone, a tablet personal computer, a cellular telephone, a message device or combination thereof.

The server 102 may contain an image database 108 and a classifier database 110. The images stored in the image database 108 are annotated with a geo-tag containing a geophysical location and a class identifier. In an embodiment, the geophysical location is based on a geographic coordinate system using the geographic latitude and longitude of a location on earth. The geophysical location may be represented as two numbers: one number indicates the geographic latitude; and the second number indicates the geographic longitude. A class identifies a landmark or location seen in an image. For example, a class may be a specific location or a type of urban landmark such as a street corner, building, a monument, and so on. A class identifier is an integer that represents a particular class. The images may be stored in the image database along with the associated geophysical location and the class identifier indicating which landmarks or buildings are observed in a corresponding image.

The classifier database 110 contains the classifiers. A classifier is a learned function that is trained using a set of images having the same geophysical location and class. In an embodiment, the classifiers may be random decision forests. A random decision forest contains a set of random decision trees, where each random decision tree is used to determine a probability distribution with respect to a set of classes or landmarks.

The training stage 111 may include several phases to compute the classifiers. The training stage 111 uses a set of images having a geophysical location and class corresponding to the landmarks which are stored in the image database 108. Each image is then rectified to remove the perspective distortion which may be present in the image through an image rectification module 112. Image rectification is a geometric transformation that transforms images taken from different perspectives in such a way that the perspective distortion is eliminated or minimized.

The salient features which are repeatable and also unique to the different landmarks are identified by a feature extraction module 114. The feature extraction module 114 encodes the appearance of these salient features into a binary string formed from pair wise pixel comparisons within the corresponding image patches. These are referred to as feature descriptors. A training dense matching module 116 searches for the most similar image patch for each of a set of feature descriptors. An image patch corresponds to the pixels in a square region around the location of the salient feature in the digitized image. For each image, the image patch which is most similar to a particular feature descriptor is found and a similarity score is computed. The similarity scores corresponding to all the feature descriptors are stored in a table. There is one column for each image in the table. The dense matching is accelerated using a min-hash process which is used to accelerate the dense search for the most similar feature descriptor in the whole image.

The server 102 assists a mobile device 104 in its real-time location recognition by providing the mobile device 104 with the classifier corresponding to the mobile device's approximate geophysical location. During a query stage, a location assistance module 120 receives queries from a mobile device 104 containing a geophysical location of the mobile device 104 (block 122). In response, the server transmits data, such as a classifier associated with the mobile device's approximate geophysical location and a set of feature descriptors back to the mobile device 104 (block 124).

A mobile device 104 may include a mechanism for determining its geophysical location. The mobile device 104 may contain a location module 127 that interacts with an onboard satellite receiver that tracks the mobile device's geophysical location. In an embodiment, the onboard satellite receiver may be configured to receive GPS signals which are indicative of the mobile device's GPS coordinates. Alternatively, the location module 127 may interact with a wireless transceiver in communication with a cellular network. The location module 127 may utilize the cellular network to determine the mobile device's GPS coordinates.

The mobile device 104 may also include a server interface module 126 that interacts with the server 102. The server interface module 126 uploads a query to the server containing the mobile device's geophysical location, such as its GPS coordinates (block 128). The server interface module 126 then receives data, such as the classifier and feature descriptors, from the server 102 (block 130). A photo capture module 132 may be used to capture an image of an object or landmark that is stored as a digitized image. The image is then rectified by an image rectification module 134 to remove perspective distortions.

During the query stage, a real-time dense matching module 136 constructs a high-dimensional feature vector for the captured image by densely searching in the captured image for the most similar image patches corresponding to each of the downloaded feature descriptors. Each element of the feature vector is obtained by computing the Hamming distance between each downloaded feature descriptor and the most similar image patch or feature descriptor found in the captured image. A min hashing technique is used to accelerate this search. Pairs of feature descriptors which have similar min-hash values are more likely to be similar. Therefore when searching for the descriptor most similar to a particular feature descriptor, those whose minhash values are different from that of the reference descriptor are rejected early without performing the Hamming distance computation. This eliminates unnecessary Hamming distance computations and produces a speedup in the overall computation.

The classification module 138 uses the high-dimensional feature vector to traverse each random decision tree resulting in probability estimates for each class associated with a given geophysical location. The results of the classification module 138 may be illustrated on a display 140 and may take the form of a list of landmarks or locations sorted by the probability of the class in the image. Alternatively, the results may take the form of a histogram that visually represents the probability estimates for each class. It should be noted that other visual representations may be used to represent the classification results as well.

Attention now turns to a more detailed discussion of operations of the embodiments of the location-aided recognition system 100 with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
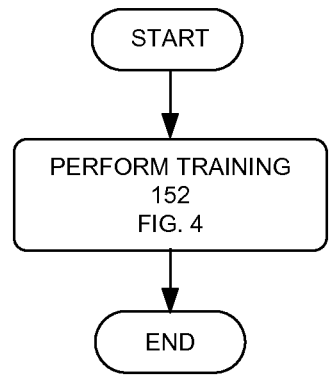
FIG. 2 is a flow chart illustrating an exemplary method for the training stage.

Referring to FIG. 2, there is shown the training performed by the server 102 (block 152). In an embodiment, the training stage is performed offline from the query processing in order to have the classifiers readily available for the query stage. However, the training may be performed at other times in the location recognition process as desired for an intended implementation.

Figure 3:
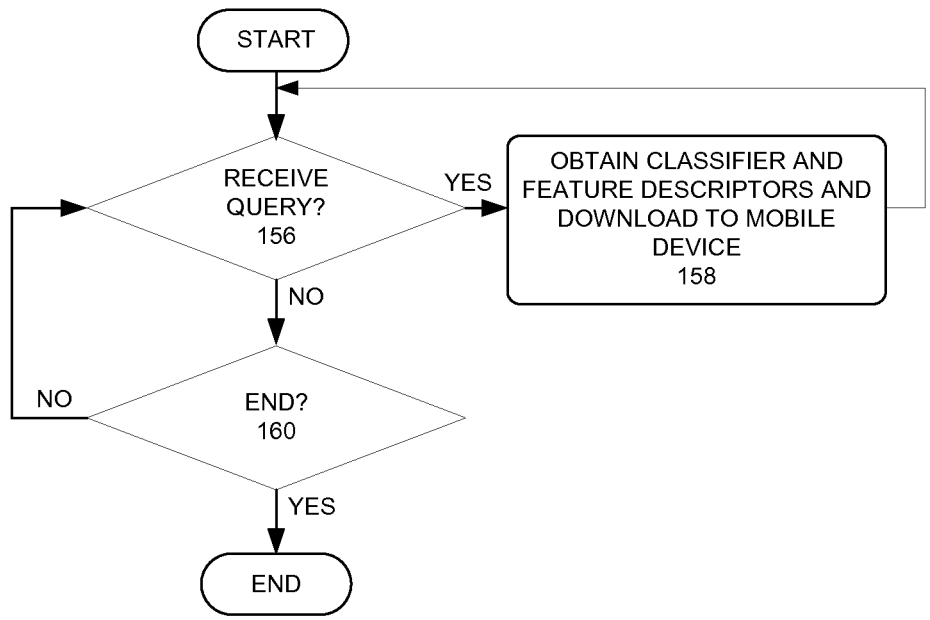
FIG. 3 is a flow chart illustrating an exemplary method for the real time query stage.

Referring to FIG. 3, the server 102 may check if a query from a mobile device 104 is pending (block 156). When a query is received from a mobile device 104 (block 156—yes), the server 102 retrieves the classifier and feature descriptors corresponding to the approximate geophysical location of the mobile device 104 from the classifier database 110 and transmits them to the mobile device 104 (block 158). Otherwise (block 156—no), the server 102 checks whether to end processing (block 160—yes) and if not (block 160—no), the server 102 continuously checks for a query from a mobile device 104.

Figure 4:
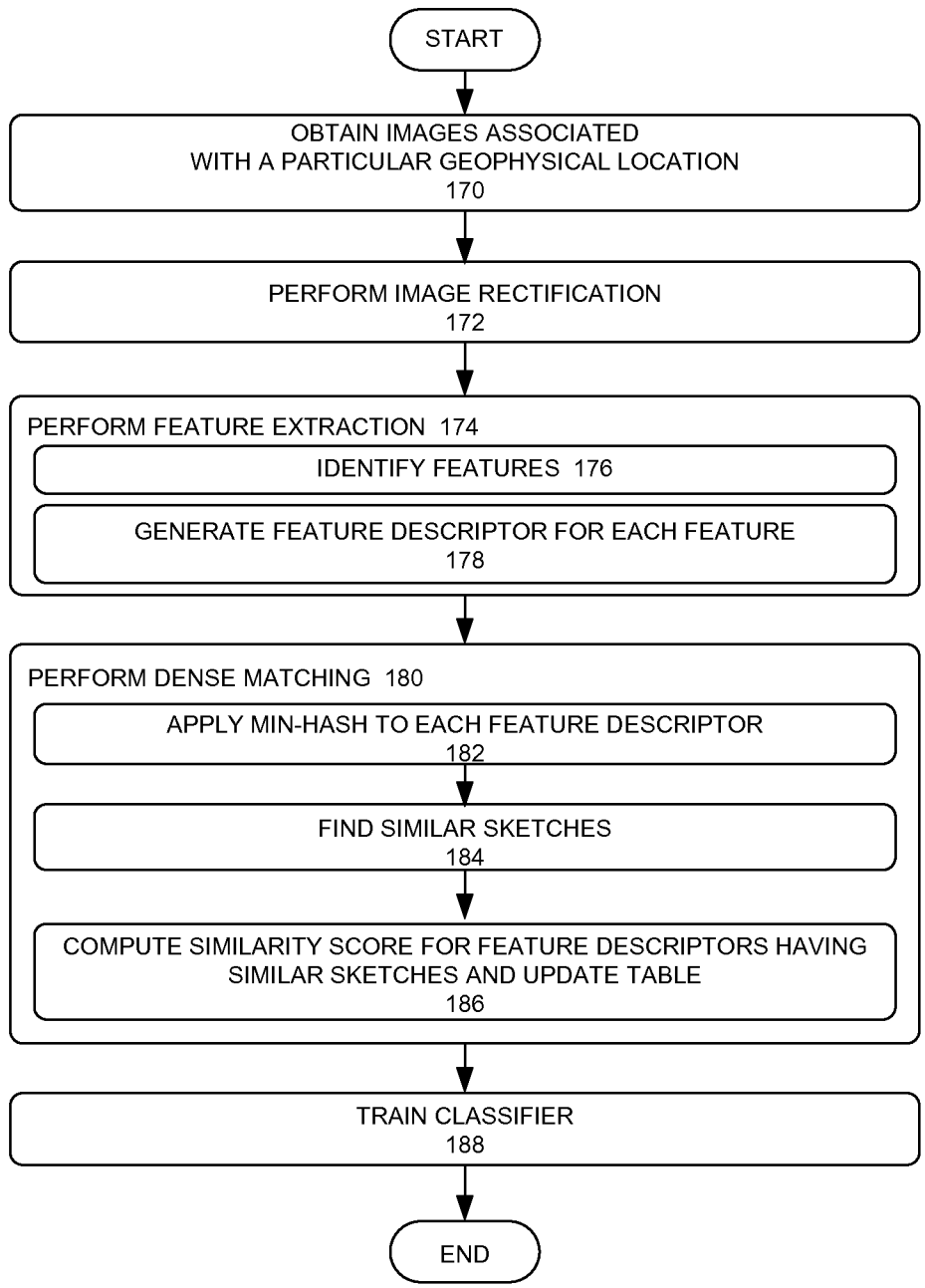
FIG. 4 is a flow chart illustrating an exemplary method for training a classifier.

FIG. 4 is a flow chart illustrating the operations performed during the training stage 152. Initially, images are collected and stored in an image database 108. Each image is annotated with a geographic location and class as described above. The classifiers are trained on images that correspond to a particular geographic location and class which are obtained from the image database 108 (block 170).

The image rectification module 112 then performs image rectification which is a geometric transformation that removes perspective distortion in an image to ensure that vertical and horizontal lines in the image are seen as vertical and horizontal lines in the rectified image respectively (block 172). In this manner, the dense matching only has to be performed across all positions in the image and across a range of scales. There are several well-known techniques to perform image rectification of images captured in urban images which rely on robustly detecting straight lines and estimating vanishing points from them and any of these techniques may be utilized. In addition, other techniques that obtain estimates from the three dimensional rotation of a mobile device from motion sensors that may be present in the mobile device may be used as well.

Next, feature extraction is performed (block 174). The feature extraction module 114 identifies a set of features whose appearance is salient and unique in the image and repeatable, that is, the feature occurs in different images of the same scene (block 176). In an embodiment, a candidate set of features is identified. The candidate set of features may be identified using any one of several well known techniques such as blob detection, edge detection, corner detection, ridge detection, and scale invariant feature transformation for scale-invariant interest point detection, and any combination thereof. Such features are represented by its location, scale and orientation in each image. A feature descriptor is computed for each candidate feature in each image such as a Scale Invariant Feature Transform (SIFT) descriptor. A robust pair wise matching is performed between all pairs of training images with the same class. Pairs of features which are deemed similar are linked to form a subset of feature descriptors. Finally a candidate feature is selected from this subset by selecting the feature whose feature descriptor has the minimum overall Euclidean distance to all other feature descriptors within this subset. This is how a set of candidate features corresponding to each class is selected for further use.

Next, a feature descriptor may be generated for each selected feature (block 178). The appearance of each feature is encoded as a feature descriptor. In an embodiment, each feature may be represented by a unique binary robust independent elementary feature (BRIEF) descriptor. This descriptor is a binary vector that is computed by first resampling the image patch corresponding to each feature into a 32×32 pixel patch. Next, k pairs of random pixels are sampled from within this 32×32 patch. A Gaussian distribution centered on the center of a feature is used to randomly sample the individual pixel positions. In an embodiment, k=192 making the feature descriptor 192-bits long. Each bit in the feature descriptor represents a comparison between the intensity levels between two randomly selected pixels in the feature. A bit is set to '1' if the first pixel has a higher intensity than the second pixel and set to '0' if the second pixel has a higher intensity than the first pixel. The k-th bit represents the result of the comparison between the k-th pair of pixels.

Figures 5, 6:
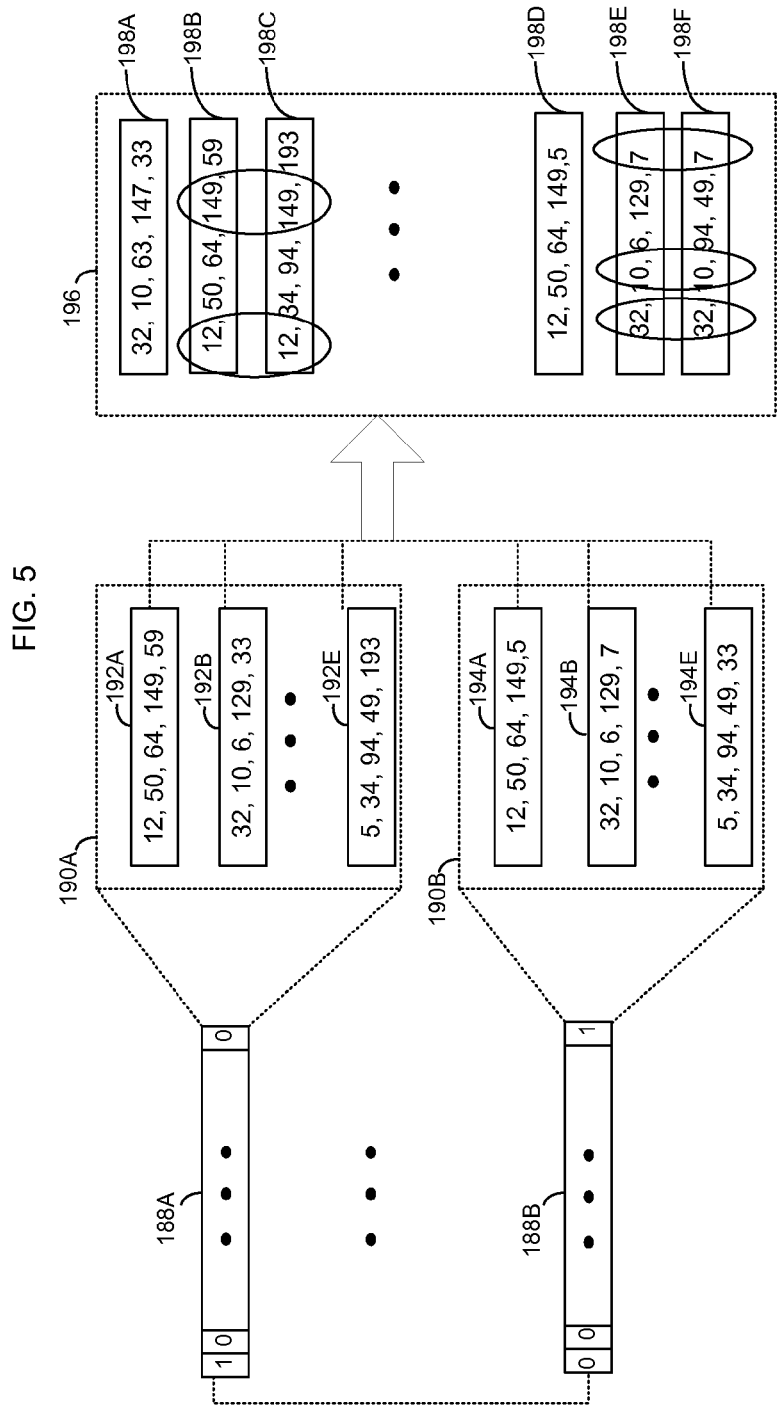
FIG. 5 is a block diagram illustrating an exemplary method for feature extraction.
FIG. 6 is a block diagram illustrating an exemplary method for dense matching.

Referring to FIG. 5, there is shown an image 180. The feature extraction module 114 identifies a number of image patches or candidate features which are shown as small boxes throughout image 180. A subset of the candidate features is selected, such as feature 182. A pair wise comparison of the intensity levels of the pixels in feature 182 is shown in block 184. The feature extraction module 114 then generates a 192-bit BRIEF feature descriptor 186 representing the results from the comparisons shown in block 184 and described above. Although FIG. 5 illustrates the process of the feature extraction module 114 for one feature, this process is performed for each feature of each image used in the training stage. As such, there may be a few hundred feature descriptors produced for a single class.

Turning back to FIG. 4, the training dense matching module 116 performs dense matching on the feature descriptors selected by the feature extraction module 114 (block 180). In dense matching, each feature is matched across each position in every image in order to determine the most similar features across all positions and scales in a set of images. Similarity is based on the distance between a feature descriptor and a feature descriptor of an image patch in the image. In some embodiments, the minimum distance may be a Hamming distance. Due to the large dimension and scale of the images, dense matching is a process that is computationally costly both in computational time and storage space. In order to achieve fast recognition, a min-hash (i.e., min-wise independent permutations) process may be used to accelerate the dense matching. Min-hashing is used to reduce the number of Hamming distance computations that are performed while searching for the most similar image patch corresponding to a feature descriptor within an image.

The min-hash function is based on a Jaccard similarity measure between sets that determines if two binary feature descriptors are similar. If a majority of the bit in two binary feature descriptors match, the Jaccard similarity will be closer to 1 and the feature descriptors are likely have similar min-hash values. The min-hash function is implemented as a random permutation on the bits contained in a binary feature descriptor. The min-hash value is the index of the first positive bit ('1') in a random permutation of that feature descriptor. A sketch is an ordered n-tuple of independent min-hash values where n is the number of applications of the min-hash function to that feature descriptor. A pair of descriptors are deemed similar if at least two of five sketches are found to be identical.

For each feature descriptor, the similarity score with its most similar descriptor found in the image is stored in a dense matching table (block 186). In an embodiment, the similarity score is a Hamming distance. The similarity score for feature descriptor x in image y, represents the Hamming distance between the descriptor x and its closest matching feature descriptor z in image y.

FIG. 6 illustrates the min-hash process. Turning to FIG. 6, there is shown two feature descriptors 188a and 188b from a set of numerous feature descriptors. Each feature descriptor 188a, 188b is min-hashed resulting in five associated sketches. Three sketches are shown for each feature descriptor 190a, 190b in FIG. 6 for illustration purposes only. Each sketch 192a-192e shows five min-hash values and each min-hash value represents an index of the first bit in the BRIEF feature descriptor that is set to one under a random permutation of the bits in the BRIEF feature descriptor.

A set 196 containing all the sketches is formed. Min-hash values between a pair of sketches 198a-f are compared. If at least two min hash values are the same, the sketches are deemed to match. As shown in FIG. 6, sketches 198b and 198c have identical min-hash values which are shown circled together. Sketches 198e and 198f have identical min-hash values which are also shown circled together. The feature descriptors associated with sketches 198b and 198c are deemed to match and the feature descriptors associated with sketches 198e and 198f are also deemed to match. The hamming distance is a function that takes two feature descriptors and determines the distance between them by determining the number of bits that are different. The hamming distance is computed for every pair of descriptors if at least two of their sketches are identical. The closest feature descriptor in an image is the feature descriptor having the lowest hamming distance from a reference feature descriptor.

Figure 7:
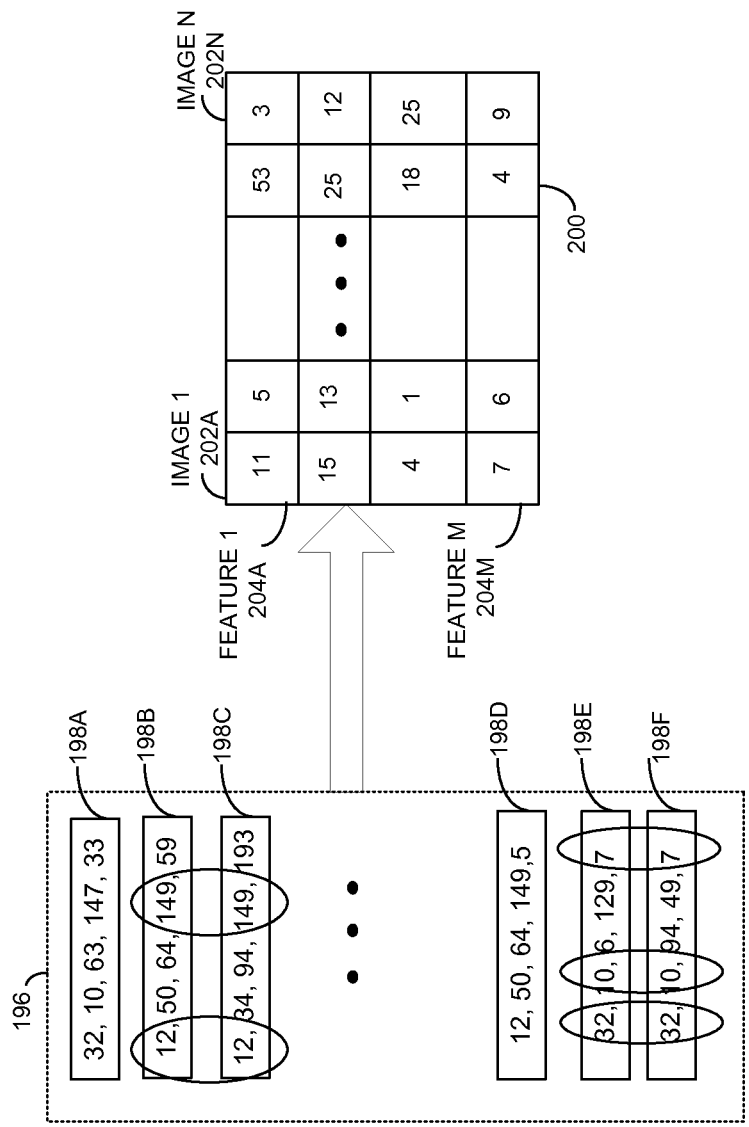
FIG. 7 is a block diagram illustrating another exemplary method for dense matching.

Turning now to FIG. 7, there is shown the matching sketches 198B, 198C and 198E, 198F from the set 196 containing all the sketches 198a-198f. The dense matching table 200 is shown as an m×n table having m rows and n columns, where each row, 204A-204M, represents a feature descriptor and each column, 202A-202N, represents an image. Each cell in the table contains the Hamming distance between the feature descriptor associated with a particular row and the most similar feature descriptor found in the image associated with a particular column.

Referring back to FIG. 4, the classifier training module 118 trains the classifier (block 188). In an embodiment, the classifier may be implemented as a random decision forest. A random decision forest is a collection of independent random decision trees that are trained separately. A random decision tree is configured as a binary tree having internal nodes and leaf nodes. Each internal node is a feature test that compares the hamming distance between two feature descriptors to a threshold. For example, in an embodiment, the feature test may be configured as follows: HD (x, s)<$T_s$, where the function HD ( ) is the hamming distance between two feature descriptors; x and s are feature descriptors; and $T_s$ is the threshold hamming distance for s. The leaf nodes store the probability distributions of the class defined over the set of classes or landmarks.

A random decision tree is built recursively starting from a root node. The feature descriptors are used to split the root node into a left and right child node. In each node, the split is based on some information theoretic criteria, such as the gini impurity criteria. The splitting feature at each node is chosen randomly from the remaining feature descriptors that have not been selected. The random decision tree stops growing if there are no more feature descriptors to split in the current node or the depth of the tree exceeds a predetermined limit. The feature descriptors are used again to randomly train another random decision tree until a predetermined number of random decision trees are formed. A random decision forest may then be formed as the aggregate collection of all the random decision trees. The random decision forest may then be stored in the classifier database 110 along with the feature descriptors used to train the random decision forest.

Once the random decision forest is formed, each random decision tree can be traversed to obtain an independent classification decision. Each random decision tree is traversed from top to bottom using a high-dimensional feature vector each of whose elements are compared to a particular threshold at each internal node. When the traversal reaches a leaf node, the probability distribution associated with the classes represented by the leaf node is recorded. The probabilities for each class from each tree are averaged and used to determine the final class probabilities.

Figure 8:
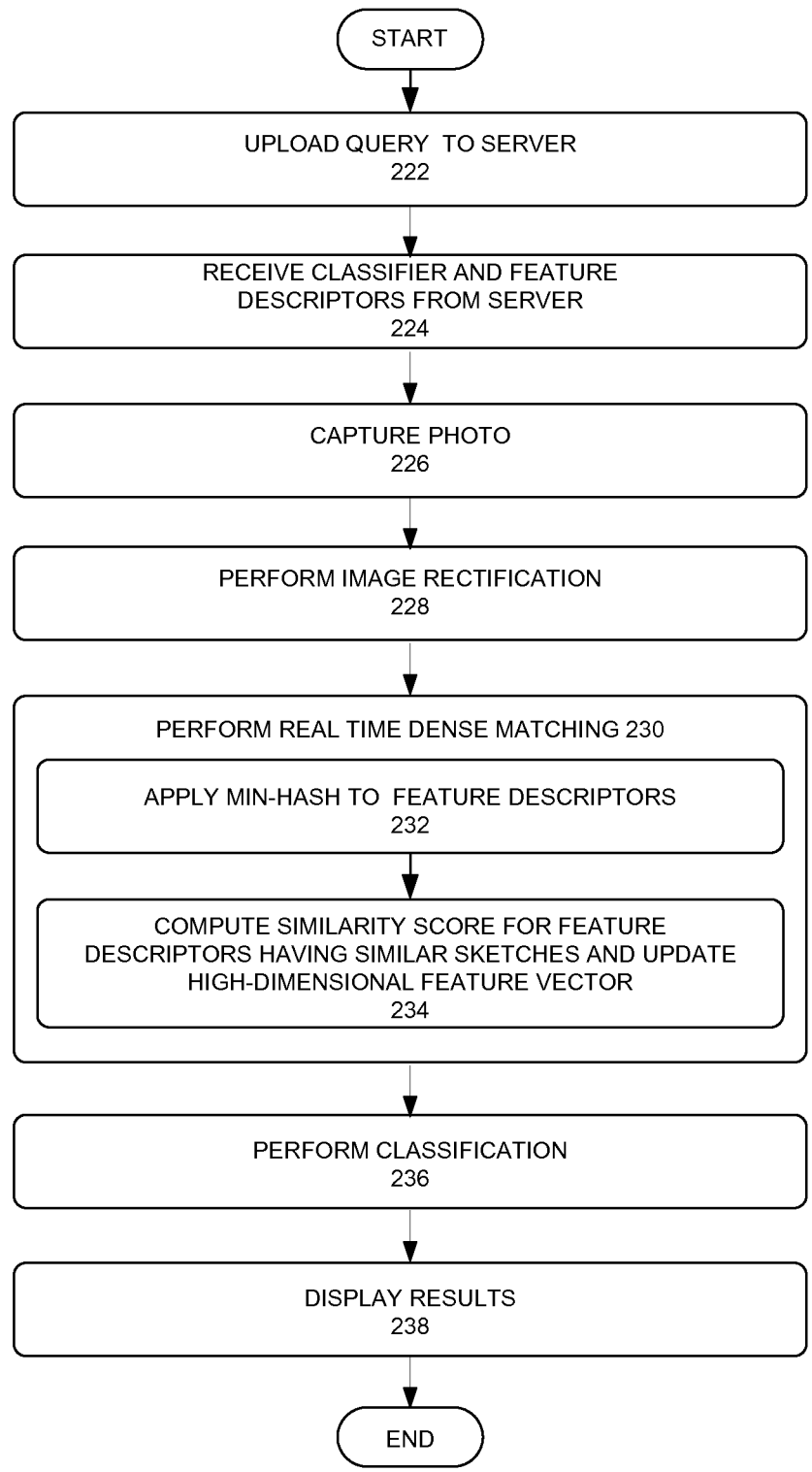
FIG. 8 is a flow chart illustrating an exemplary method for performing location-aided recognition from a mobile device.

Attention now turns to the operations performed by the mobile device 104 in the location-assisted recognition. Turning to FIG. 8, the mobile device 104 uploads to the server 102 a query containing the mobile device's geographical location (block 222). In an embodiment, the mobile device 104 may be equipped with a satellite or wireless transceiver capable of directly obtaining and tracking the geophysical location of the mobile device 104. The satellite or wireless transceiver may be configured to receive signals from any satellite positioning system, such as the Global Navigation Satellite System (GNSS) using Global Positioning System (GPS), GLONASS, Galileo, and Beidou satellites. In another embodiment, the mobile device 104 have be equipped with a wireless transceiver capable of receiving radio frequency signals from a cellular network which may be used to obtain and track its geophysical location indirectly from the cellular network. In an embodiment, the geophysical location may be comprised of the GPS latitude and longitude coordinates associated with the mobile device's geophysical location.

The mobile device 104 receives the classifier and feature descriptors corresponding to its approximate geophysical location (block 224). The mobile device 104 may be configured with a camera enabling a user to capture a photo (block 226). The captured image may then be rectified by the image rectification module 134 (block 228). In another embodiment, techniques which obtain estimates of the 3D rotation of the mobile device from motion sensors may be used to perform the image rectification if present in the mobile device.

Real-time dense matching is performed (block 230) to search the captured image for the closest match to each of the downloaded feature descriptors by generating a high-dimensional feature vector containing the similarity scores for the downloaded feature descriptors to their closest descriptors within the captured image (block 230). The real-time dense matching module 136 applies the min hashing technique to the downloaded feature descriptors and the feature descriptors representing image patches in the captured photo, to identify which of the downloaded feature descriptors have more similar features in the captured image (block 232). The min hashing technique operates as described above with respect to FIGS. 6 and 7, in generating sketches for each of the feature descriptors, identifying those feature descriptors having similar sketches, and generating a similarity score for the similar feature descriptors, the minimum of which is stored in the high-dimensional feature vector (block 234).

The high-dimensional feature vector may then be used to perform the classification (block 236). The classification module 138 traverses each random decision tree based on the high-dimensional feature vector which comprises of the similarity scores of the various feature descriptors. The result of the classification is probabilities with respect to the classes which represent the classes that are being matched to from the captured image. The results may be displayed to the user in the form of a list of classes ranked in decreasing order of probabilities (block 238).

Figure 9:
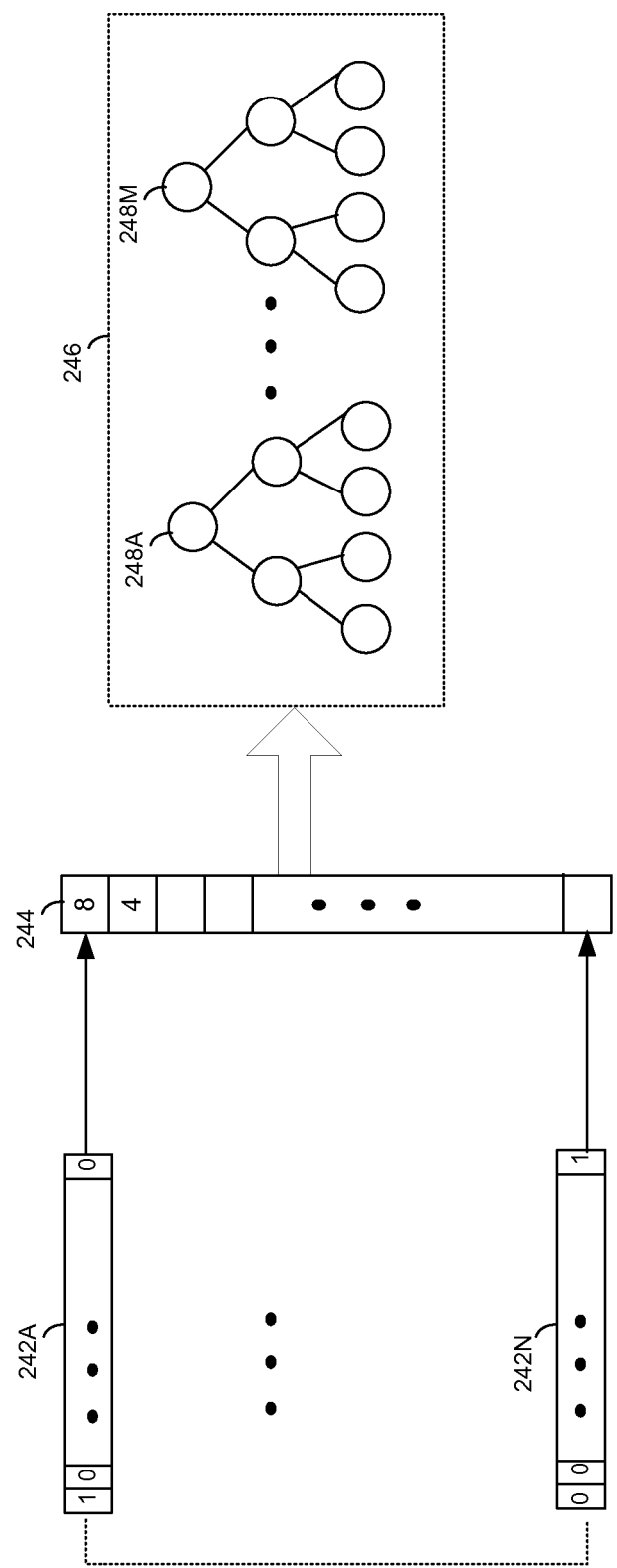
FIG. 9 is a block diagram illustrating an exemplary method for training a classifier.

Referring to FIG. 9, there is shown the set of feature descriptors 242A-242N obtained from the server. Each of the feature descriptors 242A-242N may be densely matched with feature descriptors representing image patches in the captured image through a computation of a similarity score, such as a hamming distance. The similarity score may be recorded in a high-dimensional feature vector 244. Each decision tree is traversed based on the similarity scores corresponding to a feature descriptor and a threshold contained in each internal node in the decision tree. The outcome of the traversal of a random decision tree is the probability distribution for the various classes represented by the leaf node. The class probability distributions are averaged over all the trees, and the most likely class of the image is determined. Attention now turns to a discussion of an exemplary operating embodiment.

Figure 10:
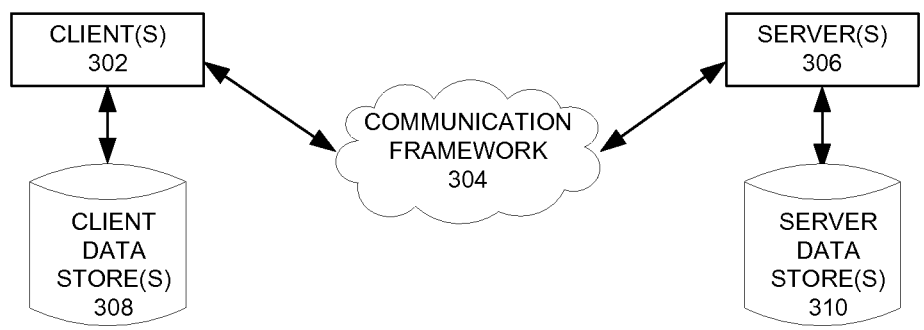
FIG. 10 is a block diagram illustrating an operating environment.

Referring now to FIG. 10, there is shown a schematic block diagram of an exemplary operating environment 300. The operating environment 300 may include one or more client(s) 302 in communication through a communications framework 304 with one or more server(s) 306. In an embodiment, a client 302 may be implemented as the mobile device 102 and the server 306 may be implemented as the server 102.

A client 302 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 302 may also be embodied as a software module having instructions that execute in a single execution path, multiple concurrent execution paths (e.g., thread, process, etc.), or in any other manner.

A server 306 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 306 may also be embodied as a software module having instructions that execute in a single execution path, multiple concurrent execution paths (e.g., thread, process, etc.), or in any other manner.

The communications framework 304 facilitates communications between the client 302 and the server 304. In an embodiment, the communications framework 304 may be embodied as the communications network 106. The communications framework 304 may embody any type of communications medium, such as wired or wireless networks, utilizing any communication protocol.

Figure 11:
FIG. 11 is a block diagram illustrating exemplary components of a mobile device in an operating environment.

Referring to FIG. 11, a mobile device 102 may have a processor 312, a memory 314, a network interface 316, a wireless transceiver 318, and a display 320. The processor 312 may be any commercially available processor and may include dual microprocessors and multi-processor architectures. The network interface 316 facilitates wired or wireless communications between the mobile device 102 and a communications network 106 in order to provide a communications path between the mobile device 102 and the server 102. The wireless transceiver 318 has the capability of transmitting and receiving radio frequency signals which may be satellite-based radio signals, cellular-based radio signals, and any combination thereof. The display 320 may be any type of screen capable of displaying visual representations to a user of the mobile device.

The memory 314 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 314 may also include one or more external storage devices or remotely located storage devices. The memory 314 may contain instructions and data as follows:
- an operating system 320;
- a location module 127;
- a photo capture module 132;
- an image rectification module 134;
- real-time dense matching module 136;
- a classification module 138;
- a server interface module 126; and
- various other applications and data 322.

Figure 12:
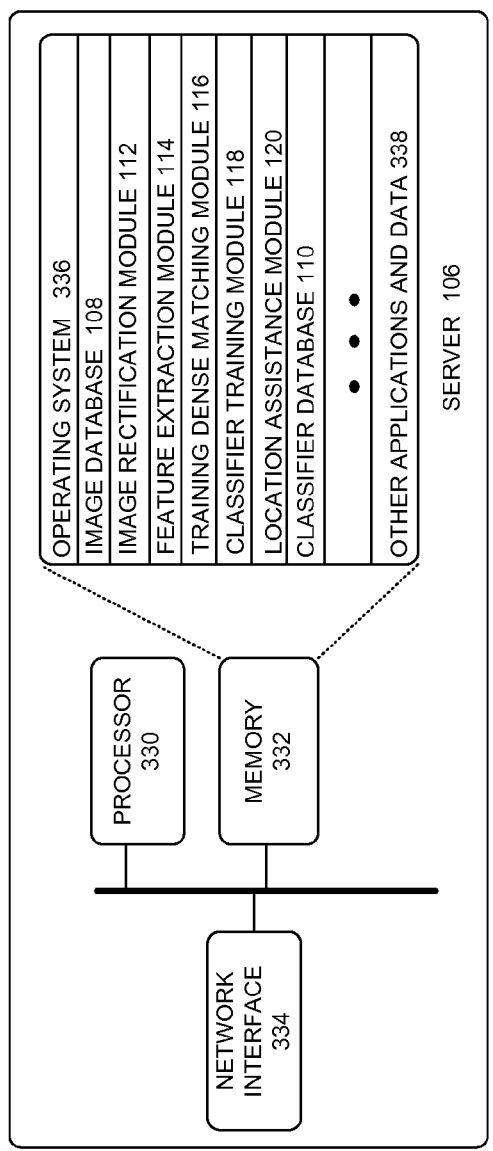
FIG. 12 is a block diagram illustrating exemplary components of a server in an operating environment.

Referring to FIG. 12, a server 106 may have a processor 330, a memory 332, and a network interface 334. The processor 330 may be any commercially available processor and may include dual microprocessors and multi-processor architectures. The network interface 334 facilitates wired or wireless communications between the server 106 and a communications network 104 in order to provide a communications path between a mobile device 102 and the server 106.

The memory 332 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 956 may also include one or more external storage devices or remotely located storage devices. The memory 956 may contain instructions and data as follows:
- an operating system 336;
- an image database 108;
- an image rectification module 112;
- a feature extraction module 114;
- training dense matching module 116;
- classifier training module 118;
- location assistance module 120;
- classifier database 110; and
- other applications and data 338.

The technology described herein provides advantages for enabling a mobile device to perform fast real-time location recognition with assistance from a remote server. The technology minimizes the amount of data transmitted between the mobile device and the server in order to improve the latency attributable to the communications medium. Geophysical location coordinates are transmitted to the server rather than an entire image. The approach for training the random decision forest automatically selects the most discriminative features for distinguishing between the various landmarks. This approach results in the random decision forest being a more compact data structure which is faster to download and beneficial for low bandwidth communication application. These techniques enable the mobile device to meet the demands of real-time location recognition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments of the system 100 may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

What is claimed:

1. A computer-readable storage medium storing thereon processor-executable instructions that when executed perform actions, the actions comprising:
    obtaining one or more feature descriptors;
    determining a similarity score for each feature descriptor with respect to a captured image, the similarity score representing a closest match of a feature descriptor to an image patch in the captured image, the similarity score computed for those feature descriptors matching an image patch in the captured image, the matching feature descriptors determined by a min-hash process; and
    recognizing the captured image through use of the similarity scores.

2. The computer-readable storage medium of claim 1, further comprising:
   determining a geophysical location that is used to obtain the feature descriptors, the feature descriptors associated with the geophysical location.

3. The computer-readable storage medium of claim 1, further comprising:
   obtaining a classifier associated with a geophysical location, the geophysical location associated with the feature descriptors; and
   applying the classifier to the feature descriptors and similarity scores to determine at least one probability that the captured image pertains to a class.

4. The computer-readable storage medium of claim 1, further comprising:
   rectifying the captured image prior to determination of the similarity score.

5. The computer-readable storage medium of claim 1, further comprising:
   representing the similarity score as a hamming distance; and
   computing the hamming distance for those feature descriptors identified as having a matching image patch.

6. A computer-readable storage medium storing thereon processor-executable instructions that when executed perform actions, the actions comprising:
   obtaining one or more feature descriptors from one or more training images, the training images associated with a common geophysical location;
   determining a similarity score for each feature descriptor with respect to each training image, the similarity score representing a similarity between a feature descriptor and a most similar feature descriptor amongst all feature descriptors corresponding to image patches in a training image, the matching feature descriptors determined by performing Hamming distance computations which is accelerated using a min-hash process applied to the feature descriptors with respect to a training image; and
   training a classifier through use of the similarity scores.

7. The computer-readable storage medium of claim 6, further comprising:
   selecting the feature descriptors from image patches in the training images having more salient features.

8. The computer-readable storage medium of claim 6, further comprising:
   generating one or more random decision trees as the classifier, each random decision tree trained using the feature descriptors and the similarity scores.

9. The computer-readable storage medium of claim 6, further comprising:
   representing the similarity score as a hamming distance; and
   computing the hamming distance for those feature descriptors matching an image patch in a training image.

10. The computer-readable storage medium of claim 9, further comprising:
    applying a min-hash method to the feature descriptors to determine those feature descriptors having similar min-hash values; and
    computing the Hamming distance for those feature descriptors having similar min-hash sketches.

11. A computer-implemented method, comprising:
    receiving a compact classifier and a first set of feature descriptors associated with a geophysical location;
    capturing an image associated with the geophysical location, the image having an unknown class;
    generating a second set of feature descriptors from the captured image;
    computing minhash values for each feature descriptor in the first set with each feature descriptor in the second set;
    generating a similarity score for each feature descriptor in the second set having similar minhash values with a feature descriptor in the first set; and
    applying the compact classifier to the captured image based on the similarity scores to determine a class for the captured image.

12. The computer-implemented method of claim 11, further comprising:
    requesting the compact classifier from a first device, the request containing the geophysical location of the first device; and
    wherein the compact classifier is received by a second device remotely located from the first device.

13. The computer-implemented method of claim 11, further comprising:
    wherein the compact classifier is a random decision forest including a plurality of random decision trees; and
    wherein applying the compact classifier to the captured image comprises:
      traversing each random decision tree based on the similarity scores of the third set of features descriptors to obtain a likelihood that the captured image matches a particular class associated with a particular one of the random decision trees.

14. The computer-implemented method of claim 13, wherein the likelihood comprises a probability distribution; and
    averaging each probability distribution for each class overall the random decision trees to determine a class likely to be associated with the captured image.

15. The computer-implemented method of claim 13, wherein each node of a random decision tree is associated with a threshold; and
    wherein traversing each random decision tree comprises comparing a similarity score of a feature descriptor in the third set with a threshold associated with each node in a random decision tree.

16. The computer-implemented method of claim 11, wherein each feature descriptor is a BRIEF feature descriptor.

17. The computer-implemented method of claim 11, wherein identifying a third set of feature descriptors based on a similarity score further comprises:
    determining a minhash value for pairs of feature descriptors, each pair including one feature descriptor from the first set and a second feature descriptor from the second set; and
    computing a similarity score for pairs having similar minhash values.

18. The computer-implemented method of claim 11, wherein the similarity score is based on a Hamming distance.

19. The computer-implemented method of claim 11, wherein the compact classifier and the feature descriptors are generated through an offline training phase.

20. The computer-implemented method of claim 11, wherein the method is implemented on a mobile device.

* * * * *